(12) United States Patent
Lee et al.

(10) Patent No.: US 10,113,470 B2
(45) Date of Patent: Oct. 30, 2018

(54) AFTER TREATMENT DEVICE OF EXHAUST SYSTEM FOR VEHICLE

(71) Applicant: Hyundai Motor Company, Seoul (KR)

(72) Inventors: Seung Woo Lee, Seoul (KR); Hong Kil Baek, Seoul (KR); Bokyung Kim, Gyeonggi-do (KR); In Woong Lyo, Gyeonggi-do (KR); Woong Pyo Hong, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 112 days.

(21) Appl. No.: 15/273,063

(22) Filed: Sep. 22, 2016

(65) Prior Publication Data

US 2017/0122180 A1 May 4, 2017

(30) Foreign Application Priority Data

Oct. 28, 2015 (KR) .................. 10-2015-0150346

(51) Int. Cl.
*F01N 13/14* (2010.01)
*B01D 53/94* (2006.01)
*F01N 3/28* (2006.01)
*F01N 13/16* (2010.01)

(52) U.S. Cl.
CPC ............. *F01N 13/14* (2013.01); *B01D 53/94* (2013.01); *B01D 53/9431* (2013.01); *F01N 3/2803* (2013.01); *F01N 3/2839* (2013.01); *F01N 13/16* (2013.01); *B01D 2255/30* (2013.01); *B01D 2258/012* (2013.01); *F01N 2510/02* (2013.01); *Y02A 50/2322* (2018.01)

(58) Field of Classification Search
None
See application file for complete search history.

(56) References Cited

U.S. PATENT DOCUMENTS

| 4,341,842 A * | 7/1982 | Lampe ................. C09D 183/04 138/145 |
| 8,128,882 B2 | 3/2012 | Tomosue et al. |
| 2009/0060800 A1* | 3/2009 | Fernandes, Jr. .... B01D 46/2422 422/168 |

FOREIGN PATENT DOCUMENTS

| JP | 2001098187 A | 4/2001 |
| JP | 2009024615 A | 2/2009 |
| JP | 2012500927 A | 1/2012 |
| JP | 2015029928 A | 2/2015 |
| KR | 20090112424 A | 10/2009 |

* cited by examiner

*Primary Examiner* — Walter D. Griffin
*Assistant Examiner* — Jelitza M Perez
(74) *Attorney, Agent, or Firm* — Brinks Gilson & Lione

(57) ABSTRACT

Disclosed herein is an after treatment device of an exhaust system for a vehicle. The after treatment device of an exhaust system for a vehicle is connected to an exhaust pipe and includes a canning main body in which a catalyst is received and may include a heat insulation coating layer formed on an inner wall surface of the canning main body.

8 Claims, 4 Drawing Sheets

AFTER TREATMENT DEVICE OF EXHAUST SYSTEM FOR VEHICLE

CROSS-REFERENCE TO RELATED APPLICATION

This application claims priority to and the benefit of Korean Patent Application No. 10-2015-0150346 on Oct. 28, 2015, the entire content of which is incorporated herein by reference.

FIELD

The present disclosure relates to an exhaust system for a vehicle, and more particularly, to an after treatment device of an exhaust system for a vehicle capable of shortening an activation time of a catalyst.

BACKGROUND

In recent years, an environmental problem has been issued globally with respect to the release of exhaust gases from vehicles. To cope with this, regulations of exhaust gas of a vehicle have been tightened. Vehicle industries have invested enormous capital to develop an exhaust system for removing harmful ingredients included in exhaust gas and have conducted many studies for a method for reducing harmful gas and enhancing fuel consumption.

As one of the methods for reducing harmful gas, an after treatment device for purifying exhaust gas, for example, a diesel particulate filter (DPF) for reducing particulate materials (PMs) and nitrogen oxide ($NO_x$), a diesel oxidation catalyst (DOC), and selective catalytic reduction (SCR) have been used in the exhaust system.

The after treatment device has used metal materials such as platinum and palladium as a catalyst. To activate the catalyst, the supplied exhaust gas needs to be maintained at a predetermined temperature or more.

However, this conventional art takes much time to increase a temperature of the catalyst using exhaust gas after an engine starts. Therefore, conventional art requires a method for increasing temperature by injecting fuel to an after treatment device, a method for using an electric heater, or the like. Thus, conventional methods have a problem in that fuel consumption of a vehicle deteriorates.

In addition, we have discovered that the conventional methods may excessively discharge the exhaust gas including a large amount of harmful ingredients due to an activation time delay of the catalyst since heat is discharged to the outside while the high-temperature exhaust gas combusted in the engine passes through an exhaust port, an exhaust manifold, and the after treatment device.

Further, conventional methods use heat energy to heat canning (generally referred to as a "cover" in the art) enclosing the catalyst of the after treatment device and therefore causing energy loss (heat loss) independent of the catalyst activation.

Conventional methods also require durability of the canning of the after treatment device that may bear the high temperature environment, and therefore may increase costs because the canning is made of a relatively expensive material.

The preceding information is meant only for enhancing the understanding of the present disclosure and therefore it may contain information that does not form part of the prior art that is already known in this field to a person of ordinary skill.

SUMMARY

The present disclosure provides an after treatment device of an exhaust system for a vehicle. This after treatment device comprises a heat insulation coating layer capable of securing high mechanical properties and heat resistance, while having low heat conductivity and low volume heat capacity, that is applied to an inner side surface of a canning that encloses a catalyst in order to shorten an activation time of the catalyst due to a reduction in a heat loss by a heat insulation effect and to increase durability of the canning.

According to one aspect of the present disclosure an after treatment device of an exhaust system for a vehicle is provided. This after treatment device is connected to an exhaust pipe and includes a canning main body in which a catalyst is received. The after treatment device comprises a heat insulation coating layer formed on an inner wall surface of the canning main body.

The heat insulation coating layer may include an inorganic binder having two or more silicon-based compounds and an aerogel dispersed in the inorganic binder, as well as 5 to 50 parts by weight of the aerogel for 100 parts by weight of the inorganic binder. The heat insulation coating may also exhibit a heat conductivity of 1.0 W/mK or less as measured according to ASTM E1461.

The heat insulation coating layer may have a thickness of 10 µm to 2,000 µm. The heat insulation coating layer may also have an adhesive strength of 5 or less for metal as measured according to ISO 16276-2. The heat insulation coating layer may also exhibit a melting point of 100° C. to 500° C. as measured according to ASTM D3418.

The canning main body may enclose an outer side surface of a catalyst support member that supports the catalyst and has the heat insulation coating layer formed on a corresponding inner wall surface thereof at a predetermined interval from the outer side surface of the catalyst support member.

The two or more silicon-based compounds may include two or more selected from a group consisting of silanes, siloxanes, silicates, silanols, silazanes, and silsesquioxanes. Alternatively, the two or more silicon-based compounds may be silicates and silanols. The weight ratio of silanol to silicate may be 2 to 10.

The inorganic binder may include a sol-gel reactant of the two or more silicon-based compound. The silicate may also include a metal silicate salt.

The aerogel may include one or more compound selected from a group consisting of silicon oxide, carbon, polymer, and metal oxide. The aerogel may have a specific surface area of about 100 $cm^2$/g to about 1,000 $cm^2$/g.

According to another aspect of the present disclosure, the heat insulation coating layer, which is capable of securing high mechanical properties and heat resistance while exhibiting low heat conductivity and the low volume heat capacity, may be applied to the inner wall surface of the canning main body that encloses the catalyst.

According to another aspect of the present disclosure, the heat loss of the canning main body may be reduced due to the heat insulation characteristics of the heat insulation coating layer in order to shorten the activation time of the catalyst and reduce the emission of the exhaust gas.

According to yet another aspect of the present disclosure, the heat loss of the canning main body may be reduced by the ability of the heat insulation coating layer to lower the surface temperature of the outside of the canning main body. Improving the durability of the canning main body that may bear the high temperature environment promotes the use of low-grade materials for the canning main body resulting in a reduction in manufacturing costs.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

DETAILED DESCRIPTION

Figure 1:
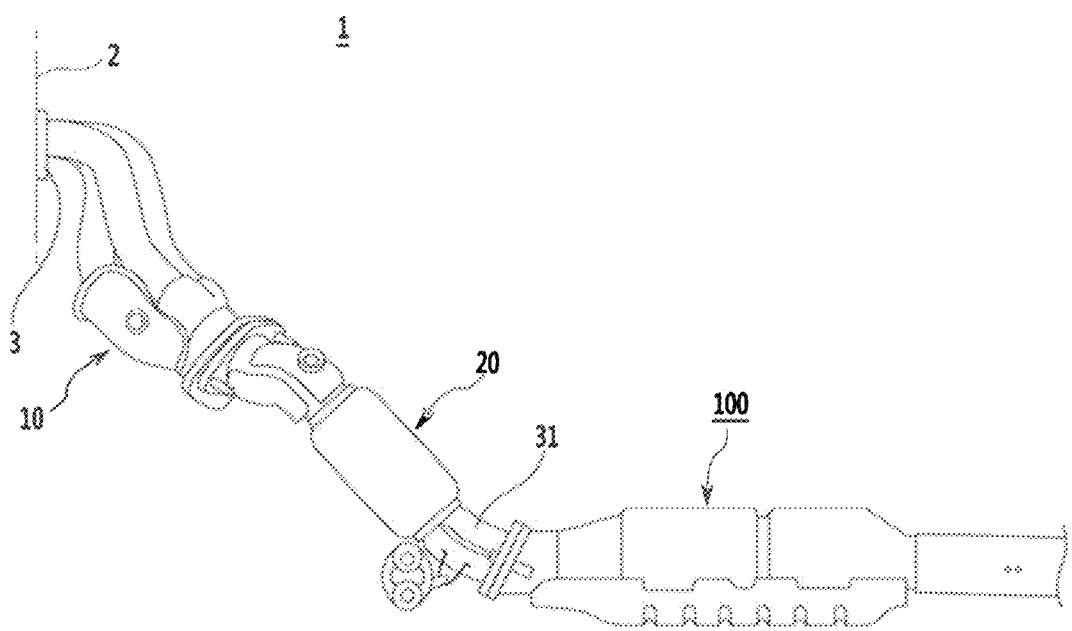
FIG. 1 is a diagram that schematically illustrates an exhaust system for a vehicle according to one aspect of the present disclosure.

The following detailed description is merely exemplary in nature, and is not intended to limit the present disclosure, application, or uses. Reference is made in detail to various forms of the present disclosure, examples of which are shown and described, simply by way of illustration.

As those skilled in the art would realize, the described various forms may be modified in various different ways, all without departing from the spirit or scope of the present invention. The drawings and description are to be regarded as illustrative in nature and not restrictive. Like reference numerals designate like elements throughout the specification.

Since sizes and thicknesses of the respective components were arbitrarily shown in the accompanying drawings for convenience of explanation, the present disclosure is not necessarily limited to contents shown in the accompanying drawings. In addition, thicknesses were exaggerated in order to obviously represent several portions and regions.

In the following detailed description, the same components are classified into first, second, and the like to differentiate names for components and a sequence thereof is not necessarily limited thereto.

Throughout the specification, unless explicitly described to the contrary, the word "comprise" and variations such as "comprises" or "comprising" will be understood to imply the inclusion of stated elements but not the exclusion of any other elements.

In addition, the terms "unit," "means," "part," "member," etc., described in the specification mean units of a comprehensive configuration for performing at least one function or operation.

Referring to FIG. 1, a diagram that schematically illustrates an exhaust system for a vehicle according to one aspect of the present disclosure is provided. In FIG. 1, an after treatment device 100 according to the teachings of the present disclosure may be applied to an exhaust system 1 for a vehicle to remove harmful ingredients in exhaust gas (hereinafter, referred to as "exhaust gas") emitted from an engine of the vehicle.

In one aspect of the present disclosure, an example in which the exhaust system 1 is applied to an engine, which is an internal combustion engine of a vehicle, is described below. However, it is not to be construed that the protective scope of the present disclosure is not necessarily limited thereto. Therefore, the technical ideas of the present disclosure may be applied as long as the exhaust system 1 has a structure which may be adopted in various internal combustion engines.

For example, the exhaust system 1 for a vehicle according to one aspect of the present disclosure may include an exhaust manifold 10 communicating with an exhaust port 3 of a cylinder head 2, a front muffler 20 communicating with the exhaust manifold 10, and the after treatment device 100 communicating with the front muffler 20. Here, the exhaust port 3, the exhaust manifold 10, the front muffler 20, and the after treatment device 100 as described above are connected to one another through an exhaust pipe 31 as an exhaust gas flow pipeline.

That is, in the specification and claims of the present disclosure, the exhaust gas flow pipeline is defined as connecting an internal pipeline of the exhaust port 3, an internal pipeline of the exhaust manifold 10, and an internal pipeline of an exhaust pipe 31 connecting between the front muffler 20 from the exhaust manifold 10 and the after treatment device 100 to one another.

Figure 2:
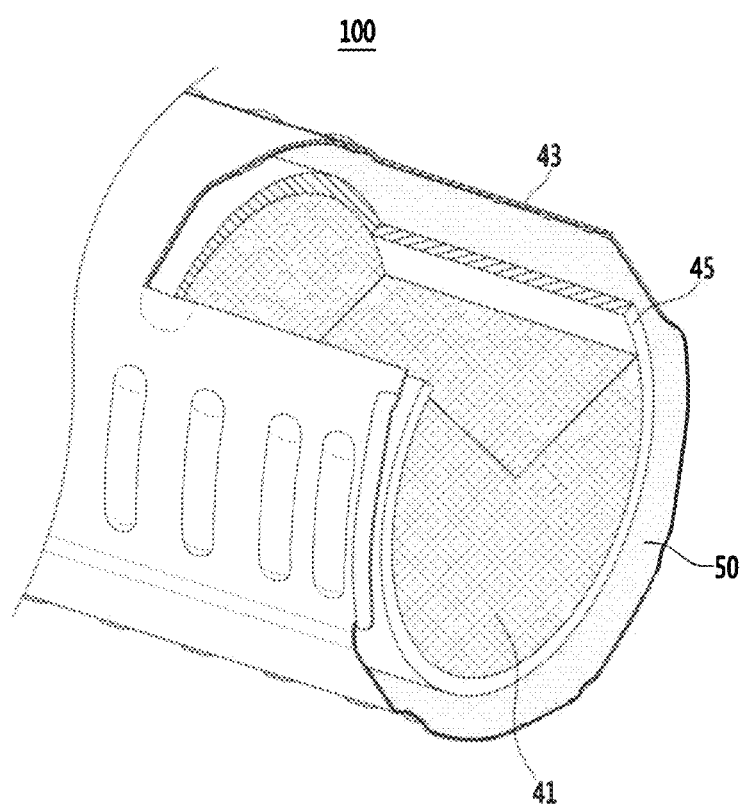
FIG. 2 is a diagram that schematically illustrates an after treatment device of an exhaust system for a vehicle according to another aspect of the present disclosure.

Referring now to FIG. 2, a diagram that schematically illustrates an after treatment device of an exhaust system for a vehicle according to of the teachings of the present disclosure is provided. In FIG. 2, the after treatment device 100 of an exhaust system for a vehicle is basically connected to the exhaust pipe 31 (refer to FIG. 1) and includes a canning main body 43 in which a catalyst 41 is received.

The catalyst 41 is formed by coating metal catalyst materials such as platinum and palladium on a honeycomb type carrier. To activate the catalyst 41, the catalyst 41 needs to be supplied with the exhaust gas to maintain a predetermined temperature or more.

The canning main body 43 may be provided as a cover enclosing an outer side surface of a catalyst support member 45 that supports the catalyst 41. The canning main body 43 forms a corresponding inner wall surface at a predetermined interval from an outer side surface of the catalyst support member 45.

In the after treatment device 100 of an exhaust system for a vehicle according to the teachings of the present disclosure, a heat insulation coating layer 50 capable of securing high mechanical properties and heat resistance, while exhibiting low heat conductivity and low volume heat capacity, is formed on the inner wall surface of the canning main body 43.

That is, one aspect of the present disclosure provides the after treatment device 100 of an exhaust system for a vehicle in which the heat insulation coating layer 50 may be applied to the inner wall surface of the canning main body 43. This shortens an activation time of the catalyst 41 due to the reduction in a heat loss by a heat insulation effect and increases the durability of the canning main body 43.

According to another aspect of the present disclosure, the heat insulation coating layer 50 may be coated on the inner wall surface of the canning main body 43, which corresponds to an outer side surface of a catalyst support member 45, at a set thickness.

Hereinafter, the heat insulation coating layer 50 applied to the after treatment device 100 of an exhaust system for a vehicle and heat insulation coating compositions thereof will be described in more detail.

The heat insulation coating composition may comprise an inorganic binder that includes two or more silicon-based compounds and 5 to 50 parts by weight of the aerogel for 100 parts by weight of the inorganic binder. According to another aspect of the present disclosure, the heat insulation coating layer, may exhibit a heat conductivity of 1.0 W/mK or less as measured according to ASTM E1461.

According to one implementation example of the present disclosure, a heat insulation coating composition, which comprises the inorganic binder including the two or more silicon-based compounds and 5 to 50 parts by weight of the aerogel for 100 parts by weight of the inorganic binder, is demonstrated.

Experiments confirm the fact that the coating compositions obtained by mixing the inorganic binder including the two or more silicon-based compounds with the aerogel and the coating layer obtained therefrom may secure the high mechanical properties and the heat resistance while having the low heat conductivity. When the coating compositions and the coating layer are applied to the exhaust system or the internal combustion engine under the high temperature condition, low heat conductivity characteristics, heat resistance, etc., may be maintained for a long period of time.

In particular, since the inorganic binder including the two or more silicon-based compounds is used, even though the heat insulation coating composition is used for a long period of time under the high temperature environment of the inner wall surface of the canning main body that is the high-temperature exhaust gas flow pipeline or the internal combustion engine, the heat insulation coating composition may impart excellent durability such that a surface form is little changed while maintaining low heat conductivity and may not have a limitation of form upon effectively dispersing the aerogel without a support such as fiber. The heat insulation coating composition having the improved adhesion strength, which can be obtained by mixing the inorganic binder with the aerogel, may be directly applied to the exhaust gas flow pipeline or a wall surface of a combustion chamber.

The following experimental examples of the present disclosure are based on the scenario in which the coating composition and the coating layer are applied to the combustion chamber of the internal combustion engine.

The two or more silicon-based compounds include two or more selected from a group consisting of silanes, siloxanes, silicates, silanols, silazanes, and silsesquioxanes. Alternatively, the silicates and the silanols may be used.

As described below, the silicates and the silanols may be cross-linked with each other by a condensation reaction. By including the silicates, the heat insulation coating composition may exhibit exceptional heat resistance. Further, by including the silanols, the viscosity of the heat insulation coating composition may be controlled to be at an acceptable level, an aerogel binding effect may be enhanced by a cross-linking reaction, and the adhesion strength may be improved.

The silicates may include a metal silicate salt. An example of the metal silicate salt is not largely limited, but for example, compounds including alkali metal ion, alkaline earth metal ion, earth metal ion, or transition metal cation, and silicate anion may be used.

Several specific examples of the metal silicate salt may include, without limitation, alkali metal orthosilicate, alkali metal metasilicate, alkali metal tetrasilicate, and/or alkali metal disilicate. Alternatively, several examples of the metal silicate salt may include, but not be limited to potassium metasilicate, sodium orthosilicate, potassium disilicate, lithium orthosilicate, lithium metasilicate, lithium disilicate, rubidium disilicate, rubidium tetra silicate, and/or guanidine silicate.

The silanol compound may include a compound represented by the following Chemical Formula 1.

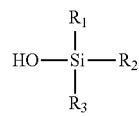

[Chemical Formula 1]

In the above Chemical Formula 1, the $R_1$, $R_2$, and $R_3$ each are hydrogen atom, a hydroxyl group, or a straight-chain or branched-chain alkyl group having a carbon number of 1 to 10, selected independently from each other. The hydroxyl group means a functional group (—OH) consisting of hydrogen and oxygen and an example of the straight-chain or branched-chain alkyl group having a carbon number of 1 to 10 is not largely limited but may include, for example, methyl, ethyl, and propyl, among others.

A weight ratio of silanol to silicate may range between 2 and 10, alternatively, between 2.3 and 7, or alternatively, between 2.5 and 5. If the weight ratio of silanol to silicate is below 2, a content of the silanol compound is excessively reduced, such that the adhesion strength of the heat insulation coating layer made from the heat insulation coating composition may be reduced. On the other hand, if the weight ratio of silanol to silicate exceeds 10, the content of the silicate compound is excessively reduced, such that the heat resistance of the heat insulation coating composition may be reduced.

The inorganic binder may include a sol-gel reactant of the two or more silicon-based compounds. The two or more silicon-based compounds are condensed by a sol-gel reaction and thus may be cross-linked with each other. By doing so, a composite is formed between the two or more silicon-based compounds, thereby improving mechanical strength and physical and chemical properties.

Further, the content of the inorganic binder may be 20 wt. % to 60 wt. % based on a weight of the heat insulation coating composition.

Meanwhile, the heat insulation coating composition according to one implementation example may be formed by mixing the inorganic binder including the foregoing two or more silicon-based compounds with 0.1 wt. % to 25 wt. % of aerogel.

The mixing method is not largely limited, but generally known physical mixing methods may be used. For specific example, without limitation, there may be a method for preparing a coating composition (coating solution) by mixing the inorganic binder including the two or more silicon-based compounds with the aerogel, adding zirconia bead thereto, and performing ball milling thereon at a speed of 100 to 500 rpm under the room temperature and normal pressure conditions.

The heat insulation coating composition according to one implementation example may provide, but not be limited to a heat insulation material, a heat insulation structure, etc., which may be maintained for a long period of time in the internal combustion engine to which the repetitive high temperature and high pressure conditions are applied. The heat insulation coating composition according to one implementation example may be used to coat an inner surface of the internal combustion engine or parts of the internal combustion engine.

The aerogel has a structure in which microfilaments having a thickness corresponding to about 1/10,000 of the thickness exhibited by hair are entangled with each other and has porosity of 90% or more. Examples of such materials thereof may include, without limitation, silicon oxide, carbon, or organic polymer. In particular, the aerogel is an ultra-low density material having high transparency and ultra-low heat conductivity due to the above-mentioned structural characteristics.

As the aerogel, a general aerogel previously known may be used. In detail, aerogels including silicon oxide, carbon, polymer, metal oxide, or a mixture of two or more thereof may be used without limitation. An example of the polymer is not largely limited, but for specific example, polyvinyl alcohol, polyvinyl acetate, polyvinylpyrrolidone, polystyrene sulfonic sodium salt, polyethylene oxide, polyvinylidene fluoride, polyvinylidene fluoride-hexafluoropropylene, polytetrafluoroethylene, polystyrene, polyvinyl chloride, or the like may be used, among others. The aerogel may have a specific surface area of about 100 cm$^2$/g to about 1,000 cm$^2$/g, or alternatively, about 300 cm$^2$/g to 900 cm$^2$/g.

The heat insulation coating composition may include 5 to 50 parts by weight or alternatively, 10 to 45 parts by weight of the aerogel for 100 parts by weight of the inorganic binder. If the content of the aerogel is below 5 parts by weight for 100 parts by weight of inorganic binder, it may be difficult to lower the heat conductivity of the heat insulation coating layer made from the heat insulation coating composition and difficult to secure sufficient heat insulation.

Further, if the content of the aerogel exceeds 50 parts by weight with respect to 100 parts by weight of inorganic binder, an excessive amount of aerogel is present in the heat insulation coating layer made from the heat insulation coating composition. In this case, ruggedness, such as a partial exposure of the surface of the aerogel to the surface of the heat insulation coating layer occurs on the surface of the heat insulation coating layer, such that an adhesion property to the inner wall of the internal combustion engine may be reduced.

The heat insulation coating composition may further include an aqueous solvent or an organic solvent. An example of the aqueous solvent is not largely limited, but for example, may include without limitation, water, methanol, ethanol, ethylacetate, or a mixture of two or more thereof.

Further, an example of the organic solvent is not largely limited, but may include, but not be limited to anisole, toluene, xylene, methyl ethyl ketone, methyl isobutyl ketone and ethylene glycol monomethyl ether, ethylene glycol monoethyl ether, ethylene glycol monobutyl ether, butyl acetate, cyclohexanone, ethylene glycol monomethyl ether acetate (BCA), benzene, hexane, DMSO, N, N'-dimethylformamide, methyl alcohol, ethyl alcohol, propyl alcohol, n-butyl alcohol, iso-butyl alcohol, tert-butyl alcohol, acetone, methylene chloride, ethylene acetate, iso propyl alcohol, or a mixture of two or more thereof.

A content of the aqueous solvent or the organic solvent may range from about 10 wt. % to about 80 wt. % or alternatively, from 20 wt. % to 70 wt. % based on the weight of the heat insulation coating composition.

The heat insulation coating composition may further include a surfactant, inorganic additives, a cross-linker, or a mixture of two or more thereof.

An example of the inorganic additives is not largely limited, but for example, may include without limitation, alumina, silica, zirconia, iron oxide, silicon carbide, mullite, titanium oxide, calcium oxide, magnesium oxide, sodium oxide, potassium oxide, or a mixture of two or more thereof. Alternatively, the iron oxide and/or the zirconia may be used.

A content of the inorganic additives may be between about 1 wt. % and about 10 wt. % or alternatively between 4 wt. % and 8 wt. % based on the weight of the heat insulation coating composition.

An example of the cross-linker is not largely limited, but a silane coupling agent may be used. Several examples of the silane coupling agent include but are not limited to, aminoethyl aminopropyl trimethoxysilane (AEAPTMS), aminopropyl trimethoxy silane (APTMS), glycidoxypropyl trimethoxy silane (GPTMS), metacryl oxypropyl trimethoxysilane (MPTMS), and a mixture of two or more thereof. The content of the cross-linker may be about 1 wt. % to about 10 wt. % based on the weight of the heat insulation coating composition.

An example of the surfactant is not largely limited, but for example, a polyolefin oxide-based block copolymer may be used without limitation. The polyolefin oxide-based block copolymer may include but not be limited to a polyolefin oxide-based repeating unit and an example of the polyolefin oxide-based repeating unit may include, without limitation, a polyolefin oxide repeating unit or a polypropylene oxide repeating unit. Several examples include but are not limited to polyolefin oxide-based block copolymers, polyethylene oxide-polypropylene oxides, polyethylene oxide-polypropylene oxide-polyethylene oxides, or the like. The content of the surfactant may be about 1 wt. % to about 10 wt. % based on the weight of the heat insulation coating composition.

Meanwhile, according to another implementation example of the present invention, the heat insulation coating layer which includes an inorganic binder including two or more silicon-based compounds and aerogel dispersed in the inorganic binder and includes 5 to 50 parts by weight of the aerogel for 100 parts by weight of the inorganic binder, and has heat conductivity of 1.0 W/mK or less which is measured by ASTM E1461 is provided.

By using the foregoing heat insulation coating layer, the aerogel is uniformly dispersed in the inorganic binder to lower the heat conductivity and the volume heat capacity of the heat insulation coating layer, thereby greatly improving the heat resistance and providing for excellent durability. The heat insulation coating layer may be used over a long-term in a combustion chamber environment at high temperature due to its high melting point.

The heat conductivity, which is measured according to ASTM E1461, of the heat insulation coating layer may be equal to or less than 1.0 W/mK or alternatively may range between 0.1 W/mK and 0.9 W/mK or alternatively, between 0.2 W/mK and 0.8 W/mK. The heat conductivity establishes how much the material may transfer heat by conduction. Generally, the lower the heat conductivity, the transfer of the heat kinetic energy is slow, such that heat insulation may be excellent. If the heat conductivity of the heat insulation coating layer exceeds 1.0 W/mK, the transfer of the heat kinetic energy is excessively fast and thus the amount of heat energy emitted to the outside of the heat insulation coating layer is increased and the heat insulation is reduced, such that energy efficiency may be reduced.

The heat insulation coating layer may include between 5 and 50 parts by weight or alternatively, between about 10 and about 45 parts by weight of the aerogel for 100 parts by weight of the inorganic binder. If the content of the aerogel is below 5 parts by weight for 100 parts by weight of inorganic binder, it may be difficult to lower the heat conductivity of the heat insulation coating layer and difficult to secure sufficient heat insulation.

Further, if the content of the aerogel exceeds 50 parts by weight with respect to 100 parts by weight of inorganic binder, an excessive amount of aerogel is present in the heat insulation coating layer, and thus ruggedness such as a partial exposure of the surface of the aerogel to the surface of the heat insulation coating layer occurs on the surface of the heat insulation coating layer, such that an adhesion property to the inner wall of the internal combustion engine may be reduced.

The melting point of the heat insulation coating layer, which is measured according to ASTM D3418, may range from about 100° C. to about 500° C., or alternatively, from about 200° C. to about 450° C., or alternatively, from about 250° C. to about 400° C.

The thickness of the heat insulation coating layer may range from 10 μm to about 1,000 μm; alternatively, from 10 μm to 2,000 μm; alternatively, from about 20 μm to about 500 μm; alternatively, from about 30 μm to about 300 μm, or alternatively, from about 50 μm to about 100 μm. As described above, the heat conductivity and the volume heat capacity of the heat insulation coating layer correspond to physical properties for a unit volume, and if the thickness is changed, physical properties may be affected. If the thickness of the heat insulation coating layer is below 10 μm, the density of the heat insulation coating layer is not sufficiently reduced, such that it may be difficult to lower the heat conductivity to an appropriate level or less and an internal corrosion preventing function and a surface protecting function may deteriorate. On the other hand, if a thickness of the heat insulation coating layer exceeds 2,000 μm, cracks may occur on the heat insulation coating layer.

The heat insulation coating layer may have an adhesive strength of 5 or less or alternatively, from 1 to about 4 for metal which is measured according to ISO 16276-2. An example of a method for measuring adhesion strength may include a method for measuring the number of detached scratches when the heat insulation coating layer is scratched and a tape is attached and detached thereto and therefrom.

Further, the volume heat capacity of the heat insulation coating layer, which is measured according to ASTM E1269, may range from 600 KJ/m$^3$K to 2,500 KJ/m$^3$K; alternatively, from about 600 KJ/m$^3$K to about 2,000 KJ/m$^3$K; alternatively, from about 700 KJ/m$^3$K to about 1,900 KJ/m$^3$K; or alternatively, from about 800 KJ/m$^3$K to about 1,600 KJ/m$^3$K. The volume heat capacity means heat capacity required to increase a temperature of a material of a unit volume by 1° K and may be obtained by the following Equation 1.

$$\text{Volume heat capacity (KJ/m}^3\text{K)} = \text{specific heat (KJ/g-K)} \times \text{density (g/m}^3\text{)} \quad \text{Eq. 1}$$

Therefore, if the volume heat capacity of the heat insulation coating layer exceeds 2,500 KJ/m$^3$K, the volume heat capacity is not sufficiently reduced, such that the density of the heat insulation coating layer may be increased and the heat conductivity may be increased, thereby, making it difficult to acquire the targeted heat insulation.

The heat insulation coating layer according to one implementation example may provide the heat insulation material, the heat insulation structure, etc., which may be maintained for a long period of time in the internal combustion engine to which the repetitive high temperature and high pressure conditions are applied. The heat insulation coating layer according to one implementation example may be used to coat the inner surface of the internal combustion engine or parts of the internal combustion engine.

The content of the inorganic binder and the aerogel includes the content of the one implementation example as described above.

Meanwhile, the heat insulation coating layer may be formed by coating or depositing the heat insulation coating composition of the one implementation example on the inner surface of the internal combustion engine or the parts of the internal combustion engine. An example of the coating or depositing method is not largely limited, but for example, may include without limitation, a spray coating method, among others.

For example, the heat insulation coating composition according to one implementation example may be spray-coated on an object to be coated, for example, the inner surface of the internal combustion engine or outer surfaces of the parts of the internal combustion engine and is semi-dried at a temperature of 50° C. to 100° C. one time or more and the semi-dried coating composition is completely dried at a temperature of 110° C. or more to form the heat insulation coating layer. However, a detailed method for preparing a heat insulation coating layer of the implementation example is not limited thereto.

The present invention will be described in more detail in the following specific examples. However, the following examples illustrate the present disclosure, and therefore the content of the present disclosure is not limited to the following Examples.

Examples 1 to 4: Preparation of Heat Insulation Coating Composition and Heat Insulation Coating Layer Preparation of Heat Insulation Coating Composition—

Potassium metasilicate and silanol as the silicate, Pluonic® (BASF Corporation, New Jersey) as the surfactant, and aminopropyl trimethoxysilane as the cross-linker were put in a container of 5 liters including an agitator and were subjected to the sol-gel reaction for 24 hours.

Next, porous silica aerogel (specific surface area of about 500 cm$^3$/g) and iron oxide and zirconia were added thereto and then were mixed, thereby preparing the heat insulation coating composition. A content of components included in the heat insulation coating composition was described in the following Table 1.

TABLE 1

Composition of heat insulation coating composition (unit: wt. %)

| Division | Example 1 | Example 2 | Example 3 | Example 4 |
|---|---|---|---|---|
| Silica airogel | 3 | 5 | 10 | 15 |
| Silicate | 10 | 10 | 10 | 10 |
| Silanol | 40 | 37 | 32 | 27 |
| Iron oxide and the zirconia | 6 | 6 | 6 | 6 |
| Surfactant | 2 | 2 | 2 | 2 |
| Cross-linker | 2 | 2 | 2 | 2 |
| Water | 38 | 38 | 38 | 38 |

Preparation of Heat Insulation Coating Layer—

The heat insulation coating composition obtained by Examples 1 to 4 was coated on the inner wall surface of the combustion chamber of the vehicle by the spray coating method. Further, the heat insulation coating layer was formed by performing primary drying at 70° C. for 20 minutes and then performing secondary drying at 120° C. for 30 minutes. In this case, the thickness of the heat insulation coating layer was about 75 μm.

Example 5: Measurement of Physical Properties of Heat Insulation Coating Layer Obtained in Example The physical properties of the heat insulation coating layer obtained in Examples 1-4 were measured by the following methods and the results thereof are shown in Tables 2 and 3.

Heat Conductivity (W/mK)—

For the heat insulation coating layer obtained by the above Example 1, the heat conductivity was measured by a thermal diffusion measurement method using a laser flash method under the room temperature and normal pressure conditions according to ASTM E1461.

Further, the heat conductivity of the heat insulation coating layer was measured over a combustion progress time while a throttle is widely opened at 6,300 rpm within the combustion chamber formed with the heat insulation coating layer obtained in the above Example 1 and then the combustion is progressed.

Volume Heat Capacity (KJ/m$^3$K)—

For the heat insulation coating layer obtained in the above Example 1, the volume heat capacity was measured by measuring the specific heat using sapphire as a reference, by a DSC apparatus at the room temperature condition based on ASTM E1269.

Further, the volume heat capacity of the heat insulation coating layer was measured over a combustion progress time while a throttle is widely opened at 6,300 rpm within the combustion chamber formed with the heat insulation coating layer obtained in the above Example 1 and then the combustion is progressed.

Figure 3:
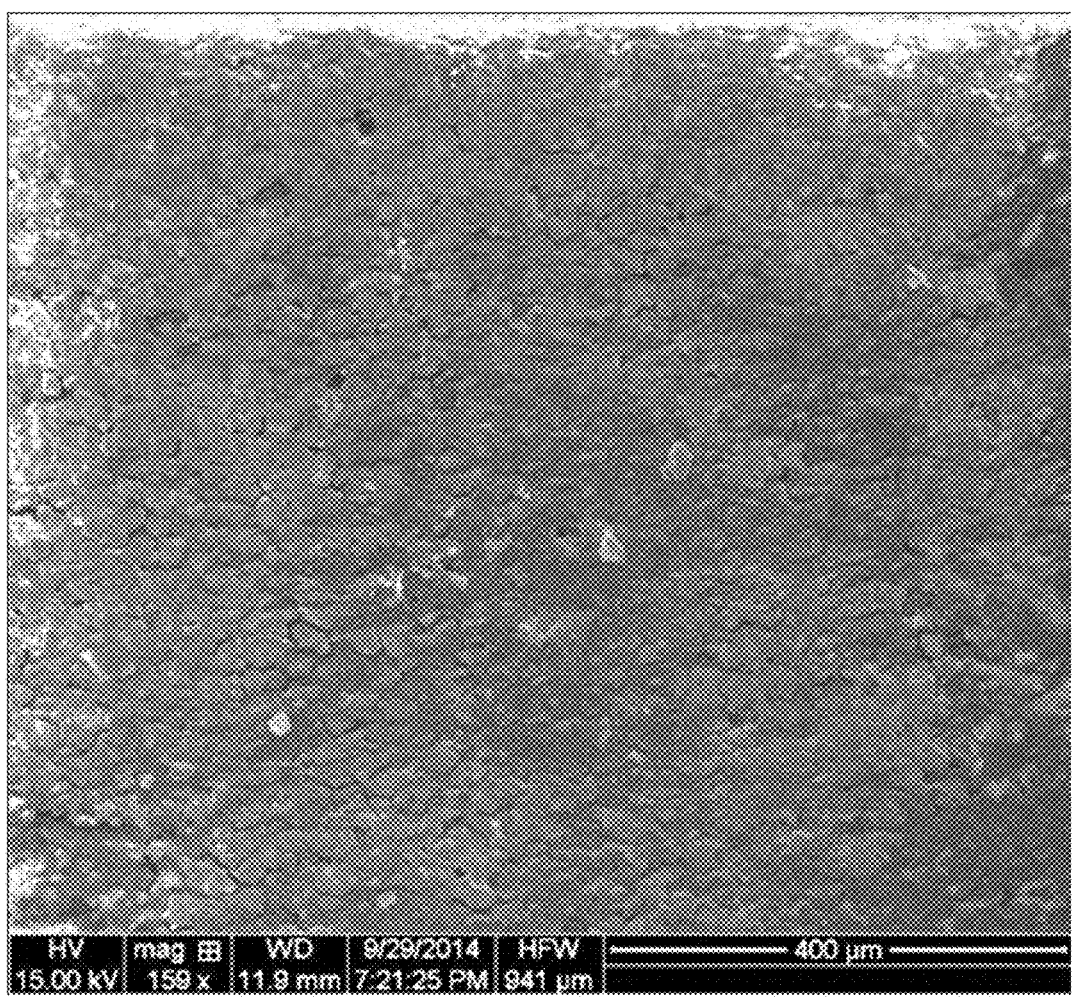
FIG. 3 is an scanning electron microscopy (SEM) image of a heat insulation coating layer applied to the after treatment device of an exhaust system for a vehicle according to the teachings of the present disclosure.

Results of the experimental examples of the heat conductivity and the volume heat capacity of the heat insulation coating layer according to the above Example 1 are shown in the following Table 2.

layer obtained in the above Example 1 and the combustion is progressed for 20 hours, the surface state of the heat insulation coating layer was confirmed by an SEM image, which is illustrated in FIG. 3.

As illustrated in FIG. 3, in the case of the heat insulation coating layer of the above Example 1, even though the combustion is performed in the combustion chamber for 20 hours, the surface of the heat insulation coating layer was maintained as it is. Therefore, as in the above Example 1, when the silicate binder and the silanol binder are mixed with each other, even though the mixture is used under the high-temperature combustion chamber environment for a long period of time, it could be confirmed that the high durability associated with maintaining the surface characteristics is achieved.

Melting Point (° C.)—

For the heat insulation coating layer obtained in the above Example, the melting point $T_m$ was measured using the DSC apparatus according to ASTM D3418.

Adhesion Strength—

For the heat insulation coating layer obtained in the above Example, the adhesion strength for metal was measured using a cross cutter according to ISO 16276-2.

TABLE 3

Results of Experimental Examples of melting point and adhesion strength of heat insulation coating layer

| Division | Example 1 | Example 2 | Example 3 | Example 4 |
|---|---|---|---|---|
| Melting point (° C.) | 273 | 295 | 319 | 377 |
| Adhesion strength | 1 | 1 | 2 | 3 |

As shown in the above Table 3, in the case of the heat insulation coating layer of the above Examples 1 to 4 in which the content of the aerogel is 5 wt. % to 15 wt. %, an appropriate amount of aerogel is contained and thus the melting point is 300° C. or more, such that the sufficient heat resistance may be implemented and the adhesion strength may be measured high, thereby improving applicability as the coating material.

TABLE 2

Heat conductivity and volume heat capacity of heat insulation coating layer

| | Combustion time (time) | | | | | | | | |
|---|---|---|---|---|---|---|---|---|---|
| | 0 | 2.5 | 5 | 7.5 | 10 | 12.5 | 15 | 17.5 | 20 |
| Volume heat capacity (KJ/m$^3$K) | 1,218 | 1,495 | 1,252 | 1,222 | 1,487 | 1,153 | 1,060 | 934 | 1,082 |
| Heat conductivity (W/mK) | 0.28 | 0.48 | 0.26 | 0.33 | 0.64 | 0.36 | 0.43 | 0.34 | 0.46 |

As shown in the above Table 2, in the case of the heat insulation coating layer of the above Example 1, even though the combustion is progressed in the combustion chamber, the heat conductivity was maintained to be lowered to 0.64 W/mK or less. Therefore, as in the above Example 1, when the silicate binder and the silanol binder are mixed with each other, even though the mixture is used under the high-temperature combustion chamber environment for a long period of time, it could be confirmed that the heat insulation maintenance effect maintaining the low heat conductivity characteristics is implemented.

Surface Characteristic—

After the throttle is widely opened at 6,300 rpm within the combustion chamber formed with the heat insulation coating Further, it may be confirmed that as the content of the aerogel is increased, the adhesion strength may be reduced while the heat resistance is improved and as the content of the silanol is increased, the adhesion strength of the heat insulation coating layer is improved.

In the after treatment device 100 of an exhaust system for a vehicle according to the exemplary embodiment of the present invention, the heat insulation coating layer 50 capable of securing high mechanical properties and heat resistance while having low heat conductivity and low volume heat capacity as described above may be applied to the inner wall surface of the canning main body 43 enclosing the catalyst 41.

Therefore, according to one aspect of the present disclosure, the heat loss of the canning main body 43 may be reduced due to the heat insulation characteristics of the heat insulation coating layer 50 to activate the catalyst 41 at a short time, thereby reducing harmful gas without additional energy consumption.

Figure 4:
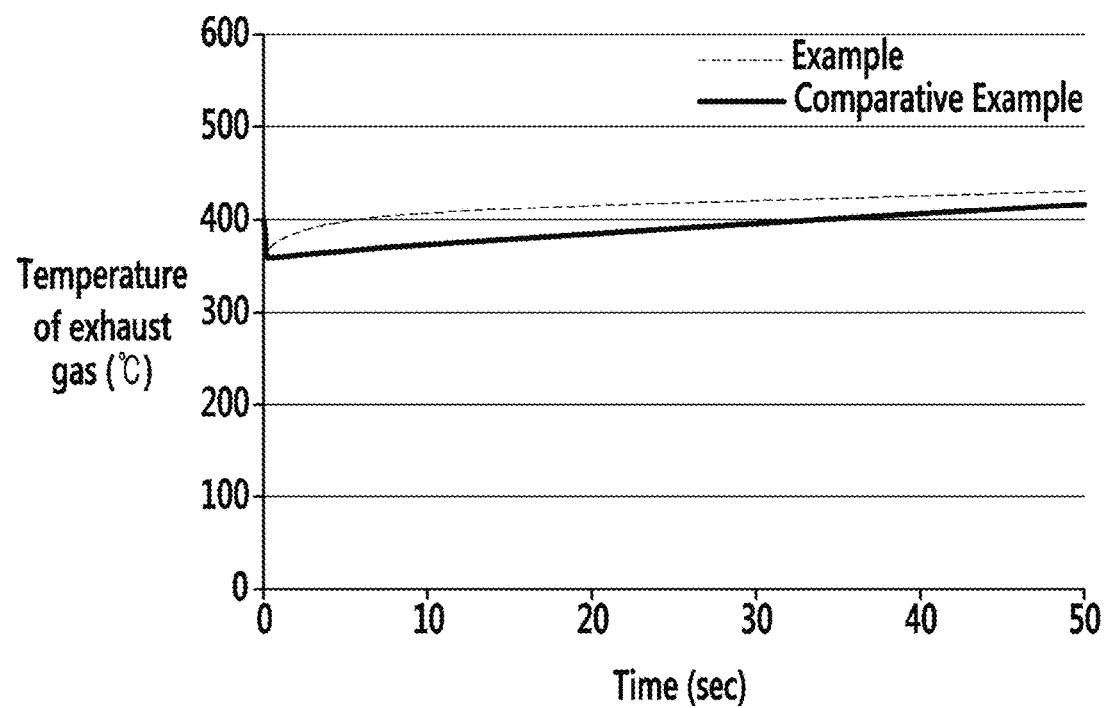
FIG. 4 is a graph that describes an action effect for the after treatment device in an exhaust system for a vehicle according to the teachings of the present invention.

That is, unlike the Comparative Example, in which the heat insulation coating layer is not formed on the inner wall surface of the canning main body, in the present disclosure, as illustrated in FIG. 4, the emission of the heat of the exhaust gas to the outside of the canning main body 43 may be reduced due to the heat insulation coating layer 50 and the temperature of the exhaust gas may be increased, and therefore the activation time of the catalyst 41 may be shortened, thereby reducing the emission of the exhaust gas.

Further, according to another aspect of the present disclosure, the heat loss of the canning main body 43 may be reduced due to the heat insulation coating layer 50 to reduce the surface temperature of the outside of the canning main body 43 to thereby more improve the durability of the canning main body 43 that may bear the high temperature environment, thereby promoting the use of the low-grade material for the canning main body 43 and saving the manufacturing costs of the after treatment device 100.

Although the exemplary embodiments of the present disclosure are described above, the technical ideas of the present disclosure are not limited to the specific embodiments disclosed in the present specification and therefore those skilled in the art understanding the technical ideas of the present disclosure may easily suggest other embodiments by supplementing, changing, deleting, adding, and the like of components within the scope of the same technical ideas, and it is to be noted that these suggested embodiments are included in the scope of the present disclosure.

While this disclosure has been described in connection with what is presently considered to be practical examples, it is to be understood that the disclosure is not limited to the disclosed examples, but, on the contrary, is intended to cover various modifications and equivalent arrangements included within the spirit and scope of the appended claims.

What is claimed is:

1. An after treatment device of an exhaust system for a vehicle connected to an exhaust pipe and including a canning main body in which a catalyst is received, comprising:

a heat insulation coating layer formed on an inner wall surface of the canning main body, wherein the canning main body encloses an outer side surface of a catalyst support member that supports the catalyst and has the heat insulation coating layer formed on a corresponding inner wall surface thereof at a predetermined distance from the outer side surface of the catalyst support member, wherein the heat insulation coating layer includes an inorganic binder that includes two or more silicon-based compounds and aerogel dispersed therein, such that the inorganic binder comprises 5 to 50 parts by weight of the aerogel for 100 parts by weight of the inorganic binder, wherein the two or more silicon-based compounds are silanols and silicates with a weight ratio of 2 to 10, respectively, wherein the inorganic binder exhibits a heat conductivity of 1.0 W/mK or less.

2. The after treatment device of claim 1, wherein the heat insulation coating layer has a thickness of 10 μm to 2,000 μm.

3. The after treatment device of claim 1, wherein the heat insulation coating layer has an adhesive strength of 5 kgf per unit area or less for metal.

4. The after treatment device of claim 1, wherein the heat insulation coating layer has a melting point of 100° C. to 500° C.

5. The after treatment device of claim 1, wherein the inorganic binder includes a sol-gel reactant of the two or more silicon-based compound.

6. The after treatment device of claim 1, wherein the silicate includes a metal silicate salt.

7. The after treatment device of claim 1, wherein the aerogel includes one or more compound selected from a group consisting of silicon oxide, carbon, polymer, and metal oxide.

8. The after treatment device of claim 1, wherein the aerogel has a specific surface area of 100 $cm^2/g$ to 1,000 $cm^2/g$.

* * * * *